United States Patent Office 3,303,366
Patented Feb. 7, 1967

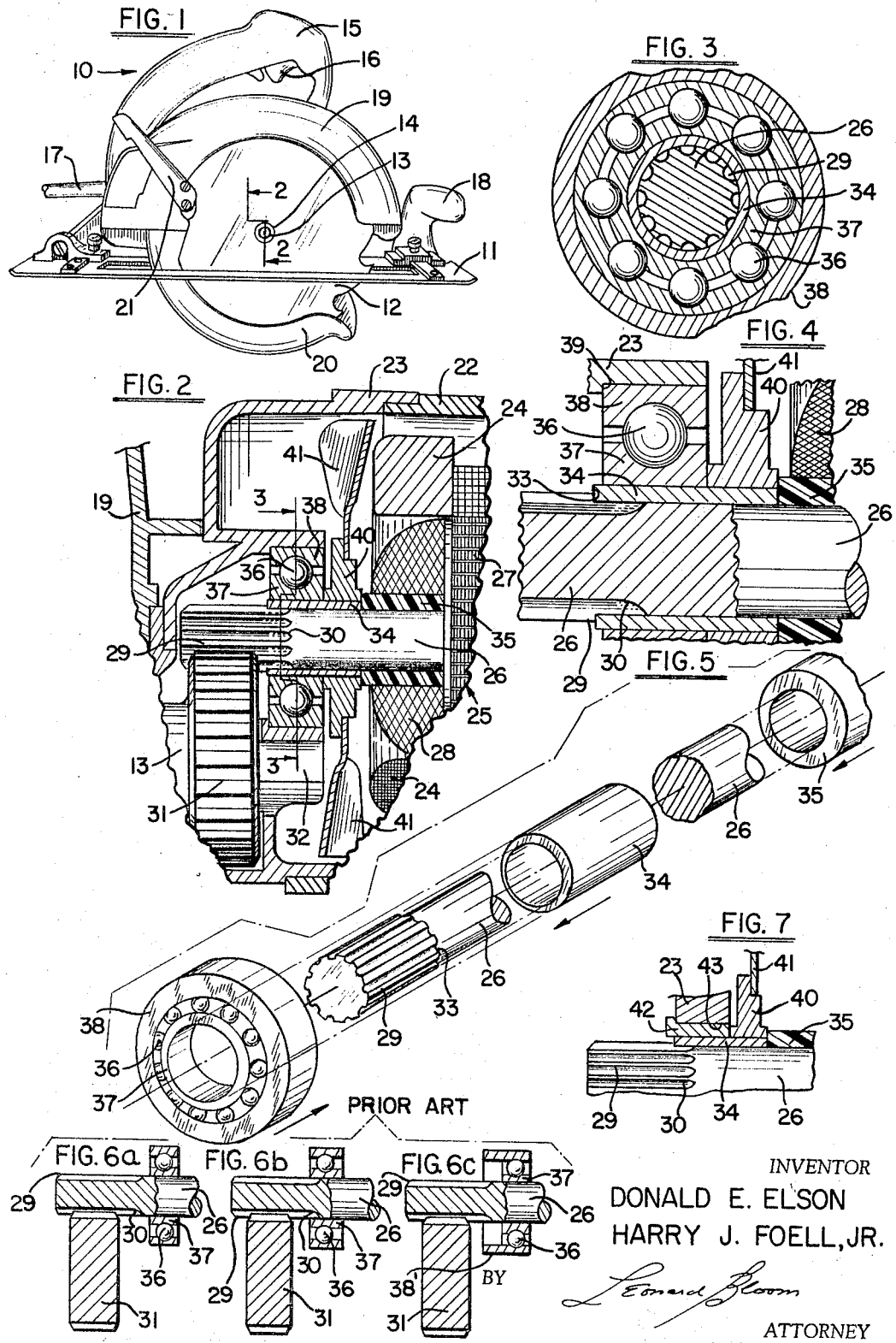

3,303,366
BEARING MOUNT FOR ARMATURE SHAFT SUB-ASSEMBLY HAVING A PINION CUTTER RUN-OUT
Donald E. Elson, Baltimore, and Harry J. Foell, Jr., Lutherville, Md., assignors to The Black and Decker Manufacturing Company, Towson, Md., a corporation of Maryland
Filed May 20, 1964, Ser. No. 368,858
4 Claims. (Cl. 310—83)

The present invention relates to a bearing mount for an armature shaft subassembly, and more particularly, to a means for mounting a bearing over the pinion cutter run-out on the armature shaft.

The present invention finds particular utility in an armature shaft sub-assembly for an electric motor-driven device of the type which comprises an armature shaft having a stack of laminations secured on the shaft, a pinion gear formed on the end of the shaft, the pinion resulting in a cutter run-out on the shaft, and a gear in meshing engagement with the pinion, the gear usually being mounted on a stub shaft whose axis is parallel to that of the armature shaft.

In the prior art of which we are aware, the forward portion of the armature shaft is journaled in a bearing, as for example a ball bearing, and the pinion portion of the shaft is cantilevered forwardly of the bearing. This arrangement, however, invariably results in a relatively-large axial distance between the bearing and the gear, a situation which, first, gives rise to relatively-high mechanical loading forces upon the cantilevered portion of the armature shaft, and secondly, results in poor engagement (and hence accelerated wear) between the teeth of the pinion and its mating gear. In order to alleviate this situation, the prior art has resorted to mounting the bearing in closer axial proximity to the gear so as to reduce the mechanical loading forces incident to the cantilevered mounting of the shaft, yet insure a good meshing engagement between the pinion and its gear. However, this necessitates a positioning of a portion of the inner race of the bearing directly over the pinion cutter run-out on the armature shaft; and in the process of press-fitting (or otherwise securing) the inner race of the bearing upon the shaft, a plurality of "corrugations" or depressions are formed inevitably on the relatively thin-walled inner race of the bearing, ultimately precipitating a premature bearing failure. One other means resorted to in the prior art comprises a modified bearing assembly, wherein the inner race is mounted rearwardly of the pinion cutter run-out, and wherein the outer race is elongated axially in the forward direction for additional mechanical support of the shaft. This is only a partial expedient, however, and does not solve the basic problem; and besides the bearing itself becomes a specialized commercial item, which is more expensive than one readily available on the market.

Accordingly, it is an object of the present invention to provide an improved bearing mounting means for an armature shaft sub-assembly having a pinion cutter run-out.

It is another object of the present invention to achieve two main results: one, to materially reduce the axial distance between the gear and the bearing, thereby reducing the loading forces and insuring good engagement between the pinion and its mating gear; and secondly, to dampen out (or altogether prevent) any "corrugations" or imperfections from being formed on the inner race of the bearing in the process of mounting it over the pinion cutter run-out.

It is yet another object of the present invention to provide a bearing mounting means which is inherently rugged and reliable and which will be economical to produce.

In accordance with the broad teachings of the present invention, the improved bearing mounting means includes a sleeve secured on the shaft and having a portion covering the pinion cutter run-out. An insulated spacer means, preferably in the form of a collar, is provided between the sleeve and the lamination stack, and a bearing is fitted over the sleeve to journal the shaft. The sleeve supports the bearing over the pinion cutter run-out and prevents any wakening of the bearing due to the run-out, yet facilitates a mounting of the gear in closer axial proximity to the bearing.

In accordance with the specific teachings of the present invention, the improved bearing mounting means includes a shoulder formed on the shaft substantially between the pinion and its cutter run-out. A sleeve is secured on the shaft rearwardly of the shoulder, abuts against the shoulder, and has a portion covering the pinion cutter run-out. An insulated spacer collar is disposed between the sleeve and the lamination stack. A ball bearing has its inner race secured on a forward portion of the sleeve, such that the sleeve supports the bearing over the pinion cutter run out, and such that the gear may be mounted in closer axial proximity to the bearing. The remaining portion of the sleeve carries a fan hub which is disposed axially between the spacer collar and the inner race of the bearing.

These and other objects of the present invention will become apparent from a reading of the following specification, taken in conjunction with the enclosed drawings, in which:

FIGURE 1 is a side elevation of a typical electric motor-driven device with which the teachings of the present invention may find particular utility;

FIGURE 2 is a stepped section view taken along the lines 2—2 of FIGURE 1, showing the improved bearing mounting means of the present invention;

FIGURE 3 is a transverse section taken along the lines 3—3 of FIGURE 2 and enlarged somewhat over the scale of FIGURE 2;

FIGURE 4 is an enlarged fragmentary portion of FIGURE 2 showing the sleeve secured on the armature shaft for supporting the fan hub and the inner race of the ball bearing;

FIGURE 5 is an exploded perspective view of the basic components of the present invention;

FIGURES 6a, 6b, and 6c are schematic illustrations of the bearing mounting means employed in the prior art; and FIGURE 7 is a modification of the bearing mounting means of FIGURE 2, wherein a sleeve bushing is slidably fitted over the sleeve.

With reference to FIGURE 1, there is illustrated a portable electric saw 10 with which the teachings of the present invention may find particular utility; however, it will be understood by those skilled in the art that the teachings of the present invention are equally applicable to a wide variety of electric motor-driven devices and are not necessarily confined to the specific embodiment illustrated in FIGURE 1. With this in mind, the saw 10 comprises a substantially-flat shoe plate 11 by means of which the saw may be supported upon the top surface of a workpiece, a blade 12 extending beyond the shoe plate for engagement with the work, an arbor 13 and a lock nut 14 for mounting the blade upon the arbor, a control handle 15 provided with a trigger switch 16 for energizing the unit from an electrical line cord 17, a front knob 18 to assist in guiding and controlling the unit, an upper guard 19 for the blade, a pivoted lower guard 20 adapted to telescope within the upper guard upon engagement with the work, and a lever 21 secured to the lower guard to facilitate its optional manual retraction.

With reference to FIGURE 2, there is illustrated a generally-cylindrical motor housing 22 with a gear case 23 secured to the motor housing in a suitable manner. The motor housing encases an electrical motor which comprises a field 24 and an armature 25. The armature 25 includes an armature shaft 26; and an armature core, preferably comprising a stack of laminations 27, is mounted on the shaft. The lamination stack 27 is provided with conventional winding slots (not shown) and a plurality of coils are wound upon the stack; the coils are conventional and include end coils denoted as at 28.

With reference again to FIGURE 2, and with further reference to FIGURES 3–5, a pinion 29 is formed (or otherwise generated) upon the end of the armature shaft 26; and in the process of forming the pinion, a pinion cutter run-out, denoted as at 30, is formed on the shaft rearwardly of the pinion. The pinion 29 engages a mating spur gear 31; and preferably, the gear 31 is mounted directly upon the arbor 13, the rearward portion of which is journaled in a bearing 32 in the gear case. A shoulder 33, see FIGURE 4, is formed on the armature shaft 26 adjacent to the forward portion of the pinion cutter run-out 30. A sleeve 34 is secured, preferably by press-fitting, over the armature shaft 26, abuts against the shoulder 33, and has a portion covering the pinion cutter run-out 30. An insulated spacer collar 35 is slidably received over the shaft 26 and is disposed between the sleeve 34 and the stack of laminations 27. A ball bearing 36 is provided which includes an inner race 37 and an outer race 38, and the inner race 37 of the bearing is secured, preferably by press-fitting, upon the forward portion of the sleeve 34. The outer race 38 of the bearing 36, see FIGURE 4, is suitably retained within an interior wall of the gear case 23 and abuts against a shoulder 39. A fan hub 40 is secured, preferably by press-fitting, on the remaining portion of the sleeve 34; and the fan hub 40 is disposed axially between the insulated spacer collar 35 and the inner race 37 of the bearing 36, and if desired, with a slight axial clearance therebetween. A plurality of conventional vanes or blades 41 are carried by the fan hub 40 in the usual manner.

The structure of the present invention and its inherent advantages may be appreciated more readily by first examining the structures habitually employed in the prior art, and then, comparing these structures against that of the present invention. In FIGRE 6a, the usual arrangement is illustrated of a pinion 29 and its mating gear 31, the pinion being formed on the armature shaft 26, and the shaft being journaled in the bearing 36. Here, the axial distance between the gear and the bearing is relatively large, with the result, first, that relatively-high mechanical loading forces are imposed upon the cantilevered portion of the armature shaft and its supporting bearing, and secondly, that relatively-poor engagement is obtained between the respective teeth of the pinion and its mating gear, a condition which results in accelerated wear. One solution that has been resorted to in the prior art is illustrated in FIGURE 6b. Here, the bearing is mounted in closer axial proximity to the mating gear, but this requires a portion of the inner race of the bearing to be mounted over the pinion cutter run-out 30, with the result that the relatively thin-walled inner race 37 is weakened and is generally formed with a plurality of minute "corrugations," which, however trival to the casual observer, nevertheless results in premature bearing failure. One other structural solution suggested by the prior art is that which is illustrated in FIGURE 6c. Here, the bearing 36 has a specially-formed outer race 38' which is elongated in the forward axial direction for additional mechanical support, but this requires a specialized bearing, one that is more expensive; and besides, it is only partially satisfactory in absorbing the mechanical forces incident to the relatively-high distance between the bearing and the gear.

The structure of the present invention alleviates the mechanical deficiencies of the prior art, yet is fully compatible with electrical requirements for insulating the supporting sleeve from the stack of armature laminations. The bearing 30 is mounted over the pinion cutter run-out 30 so as to reduce the axial distance between the bearing 36 and the gear 31, and the sleeve 34 supports the bearing and prevents any corrugations or imperfections from being generated on the inner race of the bearing 36 in the process of slidably press-fitting the bearing upon the armature shaft 26. This allows the bearing to be mounted in closer axial proximity to the gear 31; and hence reduces bearing loads, reduces the mechanical loads upon the cantilevered portion of the armature shaft, allows a larger bearing to be used in a given sized housing, results in better engagement between the respective teeth of the pinion and its mating gear, and improves the life of the pinion and gear. Moreover, the insulated spacer collar 35 serves a twofold function: one, it electrically insulates the end coils 28 from the armature shaft 26; and two, it prevents any appreciable creepage of the sleeve 34 (rearwardly of the armature shaft 26) when the bearing 37 is press-fitted over the sleeve from the forward end of the armature shaft. The resulting structure also accommodates a press-fitting of the fan hub 40 upon the remaining portion of the sleeve 34, with the result that the hub 40 is axially disposed between the insulated spacer collar 35 and the inner race of the bearing 36, and if desired, with a slight axial clearance therebetween.

In the preferred embodiment, the method of producing the structure is as follows: The armature shaft 26 has the pinion 29 formed thereon (with its attendant pinion cutter run-out 30) and thereafter, the diameter of the shaft is reduced so as to form the annular shoulder 33. The sleeve 34 is press-fitted on the shaft 26 from the rear end of the shaft, see FIGURE 4, and abuts against the shoulder 33. Next, the spacer collar 35 is slidably fitted on the armature shaft 26; and thereafter, the stack of laminations 27 is secured on the armature shaft (and the coils wound on the stack) in the usual fashion. The fan hub 40 is then press-fitted on the rear portion of the sleeve (from the forward end of the shaft) and then, the inner race 37 of the ball bearing 36 is press-fitted on the forward portion of the sleeve 34 from the forward end of the shaft. If desired, the fan hub 40 and the bearing 36 may be pressed on the shaft 26 simultaneously. Preferably, the fan hub 40 has a slight axial clearance between the spacer collar 35 and the inner race 37 of the ball bearing 36.

A modification is illustrated in FIGURE 7. Here, a flanged bushing 42 is slidably fitted over the sleeve 34 so as to rotatably journal the armature shaft 26 within the gear case 23.

Obviously, many modifications may be made without departing from the basic spirit of the present invention; and accordingly, within the scope of the appended claims, the invention may be practiced other than has been specifically described herein.

We claim:

1. In an armature shaft subassembly for an electric motor-driven device of the type which comprises a shaft, a pinion formed on the end of the shaft, the pinion being formed in such manner as to produce a pinion cutter run-out on the shaft rearwardly of the pinion, and a gear in meshing engagement with the pinion, the improvement which comprises:

(A) the shaft having a portion rearwardly of the pinion which is reduced slightly in diameter, thereby forming a shoulder on the shaft substantially between the pinion and the pinion cutter run-out;

(B) a sleeve abutting against said shoulder and disposed on the shaft rearwardly of the shoulder; and (C) a bearing mounted over said sleeve, whereby said sleeve supports said bearing over the pinion cutter run-out, and whereby the gear may be mounted in closer axial proximity to said bearing, thereby minimizing the structural loads on the pinion portion of the shaft which is cantilevered forwardly of said bearing.

2. The combination of claim 1, wherein:
(A) said sleeve is press-fitted on the shaft; and wherein;
(B) said bearing comprises a ball bearing having an inner race press-fitted on said sleeve.

3. In an armature shaft subassembly for an electric motor-driven device of the type which comprises an armature shaft having a stack of laminations secured on the shaft, a pinion formed on the end of the shaft, the pinion being formed in such manner as to produce a pinion cutter run-out on the shaft rearwardly of the pinion, and a gear in meshing engagement with the pinion, the improvement which comprises:
(A) the shaft having a portion rearwardly of the pinion which is reduced slightly in diameter, thereby forming a shoulder on the shaft substantially between the pinion and the pinion cutter run-out;
(B) a sleeve secured on the shaft rearwardly of said shoulder, the sleeve abutting against said shoulder, thereby covering said pinion cutter run-out;
(C) an insulated spacer collar disposed axially between said sleeve and the lamination stack; and
(D) a bearing secured on said sleeve, whereby said sleeve supports said bearing over the pinion cutter closer axial proximity to said bearing, thereby reclosed axial proximity to said bearing, thereby reducing the cantilevered structural loading on the shaft and bearing.

4. In an armature shaft subassembly for an electric motor-driven device of the type which comprises an armature shaft having a stack of laminations secured on the shaft, coil windings on the stack, a pinion formed on the end of the shaft, the pinion being formed in such manner as to produce a pinion cutter runout on the shaft rearwardly of the pinion, and a gear in meshing engagement with the pinion, the improvement which comprises:
(A) the shaft having a portion rearwardly of the pinion which is reduced slightly in diameter, thereby forming a shoulder on the shaft substantially between the pinion and the pinion cutter run-out;
(B) a sleeve secured on the shaft rearwardly of said shoulder, the sleeve abutting against said shoulder and covering the pinion cutter run-out;
(C) means for insulating said sleeve from the windings and the lamination stack;
(D) a bearing secured on a forward portion of said sleeve, whereby said sleeve supports said bearing over the pinion cutter run-out, and whereby the gear may be mounted in closer axial proximity to said bearing, thereby reducing the cantilevered structural loading on the shaft and bearing; and
(E) a fan hub secured on the remaining portion of said sleeve rearwardly of said bearing.

References Cited by the Examiner
UNITED STATES PATENTS

| | | | |
|---|---|---|---|
| 2,294,713 | 9/1942 | Boerger | 310—50 |
| 2,461,571 | 2/1949 | Robinson | 125—33 |
| 2,552,023 | 5/1951 | Andresen | 310—50 |
| 2,763,802 | 9/1956 | Dolan | 29—155.5 |
| 2,936,644 | 5/1960 | Miller | 310—83 |
| 3,172,197 | 3/1965 | Rutledge | 29—148.4 |

MILTON O. HIRSHFIELD, *Primary Examiner.*

J. D. MILLER, *Assistant Examiner.*

UNITED STATES PATENT OFFICE
CERTIFICATE OF CORRECTION

Patent No. 3,303,366　　　　　　　　　　　　February 7, 1967

Donald E. Elson et al.

It is hereby certified that error appears in the above numbered patent requiring correction and that the said Letters Patent should read as corrected below.

Column 3, line 45, for "FIGRE" read -- FIGURE --; column 5, line 26, after "cutter" insert -- run-out and whereby the gear may be mounted in --; line 28, strike out "closed axial proximity to said bearing, thereby re-".

Signed and sealed this 16th day of July 1968.

(SEAL)
Attest:

Edward M. Fletcher, Jr.　　　　　　　　　　　EDWARD J. BRENNER
Attesting Officer　　　　　　　　　　　　　　Commissioner of Patents